Jan. 20, 1925.

E. A. JOHNSTON ET AL 1,523,482

TRACTOR TRANSMISSION

Original Filed Nov. 12, 1921      2 Sheets-Sheet 1

Inventors.
E. A. Johnston,
and P. H. Danly,
By N. P. Deaiotta
Atty.

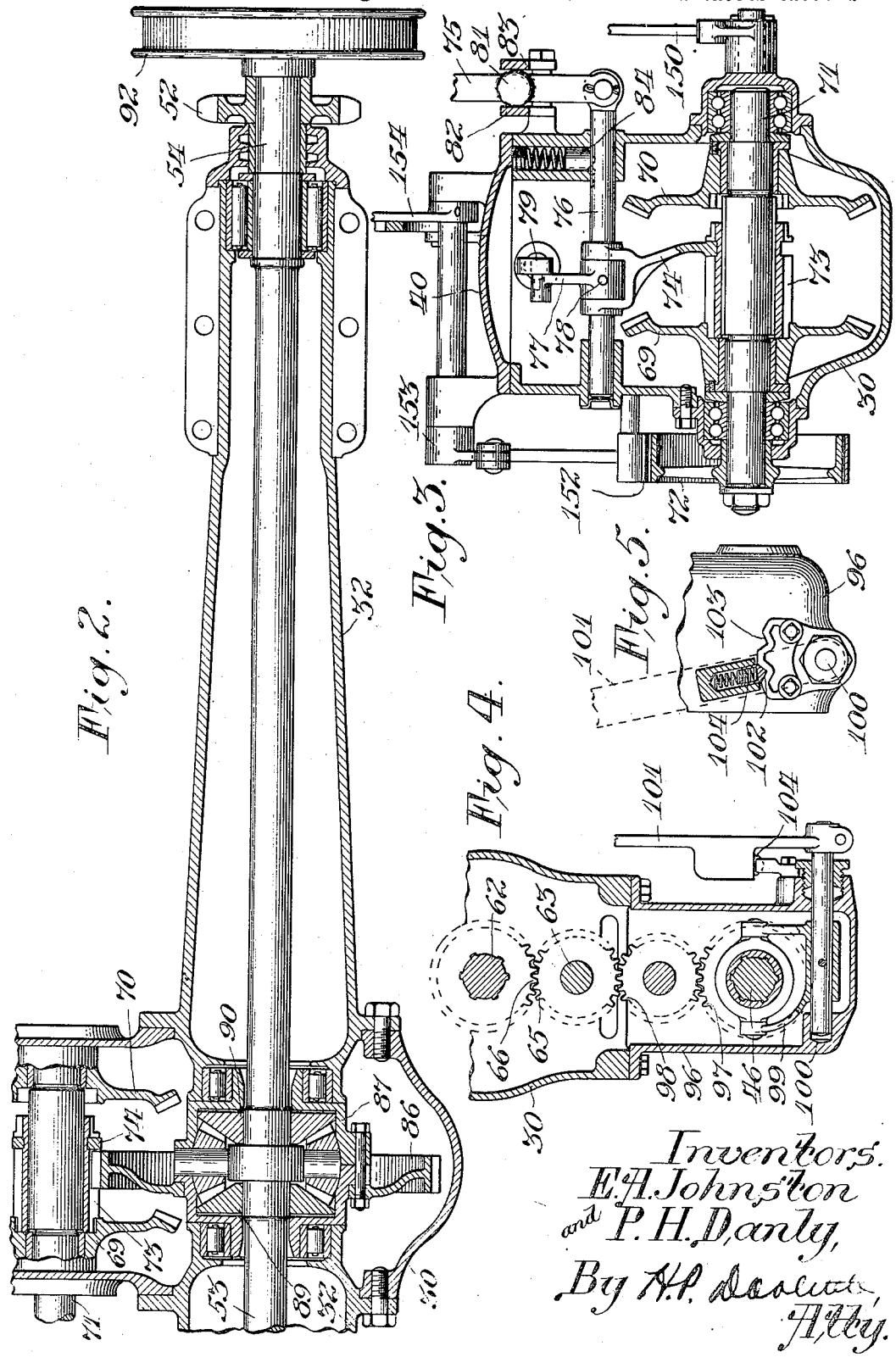

Patented Jan. 20, 1925.

1,523,482

UNITED STATES PATENT OFFICE.

EDWARD A. JOHNSTON AND PHILO H. DANLY, OF CHICAGO, ILLINOIS, ASSIGNORS TO INTERNATIONAL HARVESTER COMPANY, OF CHICAGO, ILLINOIS, A CORPORATION OF NEW JERSEY.

TRACTOR TRANSMISSION.

Original application filed November 12, 1921, Serial No. 514,516. Divided and this application filed July 23, 1923. Serial No. 653,083.

*To all whom it may concern:*

Be it known that we, EDWARD A. JOHNSTON and PHILO H. DANLY, citizens of the United States, and residents, respectively, of Chicago, in the county of Cook and State of Illinois, and of Chicago, in the county of Cook and State of Illinois, have invented certain new and useful Improvements in Tractor Transmissions, of which the following is a full, clear, and exact specification.

Our invention relates to control mechanism for transmissions for tractors of the type disclosed in our co-pending application Serial No. 514,516, filed November 12, 1921, of which this application is a division.

The primary object of our invention is to provide for a tractor a transmission and reversing mechanism having equal numbers of speeds forward and reverse and controllable by a single means. This and other objects are attained by the mechanism illustrated in the accompanying drawings in which—

Fig. 2 is a sectional view of the differential also showing a brake drum used to assist in steering the tractor, the section being taken on line 2—2 of Fig. 1;

Fig. 3 is a vertical sectional view of the forward and reverse driving gears taken on the line 3—3 of Fig. 1;

Fig. 4 is a section on line 4—4 of Fig. 1 showing a power take-off such as used for driving an implement; and Fig. 5 is a detail of the mechanism shown in Fig. 4.

Figure 1:
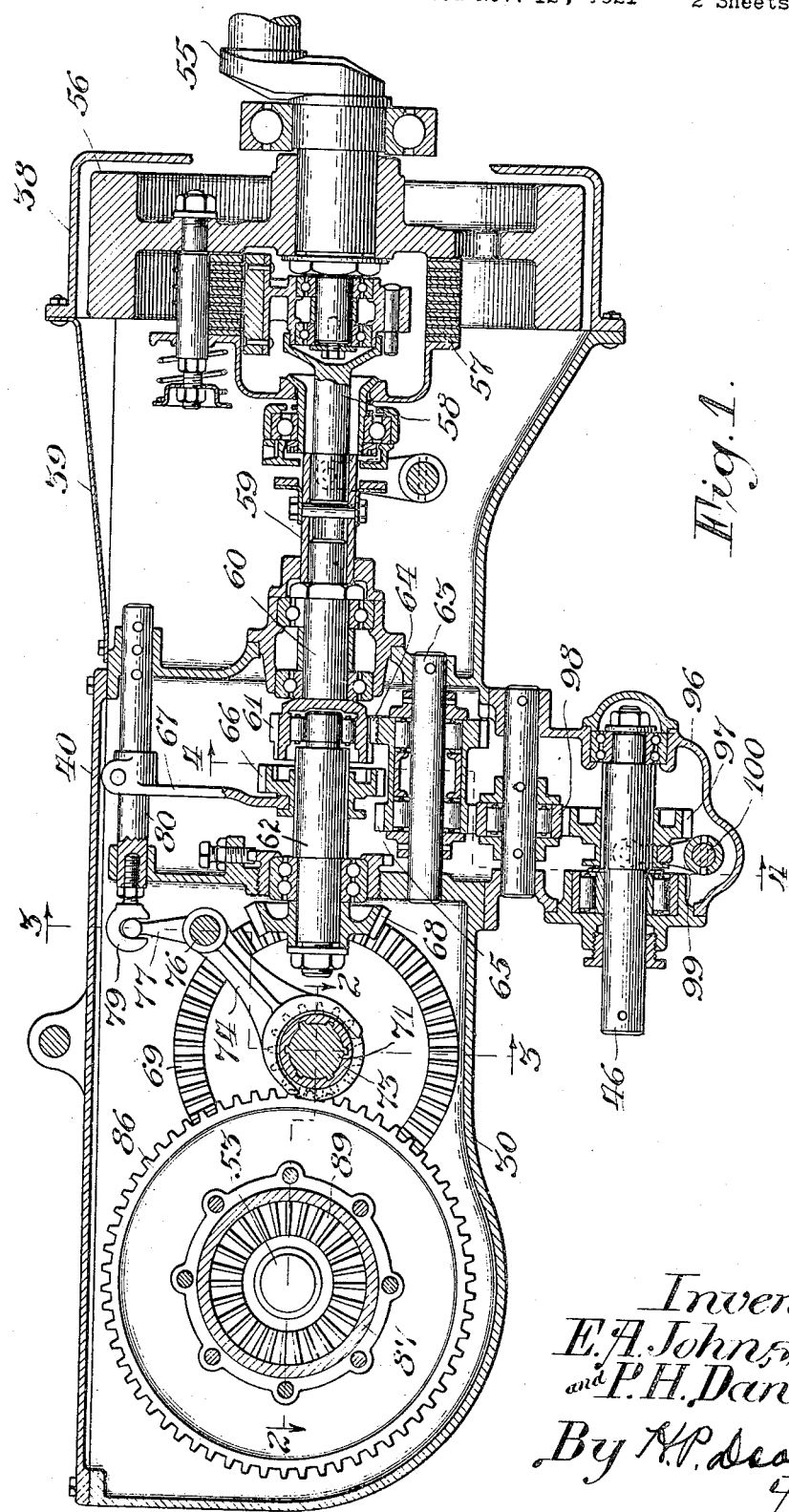
Fig. 1 is a longitudinal sectional view of the transmission and reversing mechanism embodying the invention.

Referring to Fig. 2, a tractor or similar vehicle embodying our invention comprises a casing 30 having oppositely extending hollow arms 32 forming parts of the tractor frame. A flywheel housing 38 is secured to the differential and transmission casing 30, as in Fig. 1, the open upper side of the latter being closed by removable covers 39, 40 to provide access to the enclosed mechanism. It will be understood that the wheels of the tractor are driven by sprocket chains from the sprocket pinions 52 keyed to the ends of the differential shafts 53, 54. Differential shafts are journaled in bearings in the hollow arms 32 and are driven from the engine through the transmission, reversing and differential mechanism now to be described.

Referring to Fig. 1, the engine has a crank shaft 55 to which is keyed the flywheel 56 carrying alternate disks of a multiple disk clutch 57, the other disks being carried by the clutch shaft 58, as is usual in the art. The clutch shaft is connected by a sleeve 59 to the driving shaft 60 of the transmission. The shaft 60 is rotatably supported in ball bearings in the housing 30 and at its end opposite the clutch carries a spur gear 61 which also forms one element of a clutch for direct or high speed drive of the driven shaft 62. A short fixed shaft 63 is mounted in the casing and rotatably mounted thereon are two gears 64, 65, which may be integrally formed as shown, or otherwise rigidly secured together. Gear 64 meshes with gear 61 and is continuously driven thereby, while gear 65 is adapted to mesh with a gear 66 splined to the shaft 62. The gear 66 also provides the second element of the clutch by cooperating with gear 61. The gear 66 has a groove formed therein in which the lower forked end of a shipper arm 67 engages for sliding the gear on the shaft 62. As shown in Fig. 1, the gear 66 is in neutral position and the transmission is at rest. When the gear 66 is shifted to the left or into mesh with gear 65, the shaft 62 will be driven at first or low speed through gears 61, 64 and 65, 66, and when it is shifted to extreme right position the clutch element thereon engages the clutch element on gear 61 for direct or high speed drive of the tractor. At its forward end the driving shaft 62 carries a bevel gear 68 meshing with a pair of bevel gears 69, 70 (Figs. 2 and 3) journaled on the countershaft 71, which is rotatably mounted in the side walls of the casing 30, one end extending beyond the casing and carrying a brake drum 72 for stopping the tractor. Splined on the shaft 71 between the bevel gears is a pinion 73 having a wide face and formed with a clutch element at each end adapted to cooperate with corresponding clutch elements formed on the bevel gears for driving the shaft 71 in opposite directions. The pinion 73 has a groove near one end in which the fork of a shipper arm 74 engages for sliding the gear on the shaft. It will be seen that the gear 68 may be driven at two different speeds from the engine and that it in turn rotates the gears 69, 70 in opposite directions, and that consequently the pinion 73 has two speeds forward and the same number reverse.

The pinion 73 and the gear 66 are shiftable by a single lever 75 as will now be described. The arm 74 is forked at its upper end and bored to rotatably receive the shaft 76, which is rotatably and slidably mounted in bearings in the casing 30. A T-shaped arm 77 (Fig. 3) is secured by a pin 78 to the shaft 76 within the fork on the arm 74 so as to both slide and rotate with the shaft. The bar at the upper end of the arm 77 is circular in cross section (Fig. 1) and slidably engages in a recessed member 79 which is adjustably secured in one end of a bar 80 slidably mounted in the casing and carrying the shipper arm 67. The lever 75 is secured at its lower end to one end of the shaft 76 so that fore and aft movement of the lever will oscillate the shaft about its axis, while lateral movement of the lever will shift the shaft longitudinally. The lever 75 has a ball 81 which engages between a pair of smooth sectors 82 and 83 secured to the side of the casing 30. These sectors guide the lever in its forward and reverse movement and provide a fulcrum for the ball of the lever when it is shifted laterally, as will be apparent from an inspection of Fig. 3. Referring to Fig. 3, the shaft 76 has three notches or recesses adapted to be engaged by a spring pressed detent 84, and in Fig. 1, the bar 80 is provided with three similar recesses adapted to be engaged by a similar detent. When the gear shaft lever is in neutral position, the detents engage in the central notch in each shaft and the gear 66 occupies a position intermediate the gears 61 and 65 as shown in Fig. 1, while the gear 73 will be out of engagement with both gears 69 and 70. Assume that the engine is running and the operator desires to start the tractor in a forward direction. After disengaging the main clutch 57 he grasps the upper end of the lever 75, shifting it laterally toward the left, which moves the shaft 76 longitudinally and engages the pinion 73 with gear 69. The lever is then shifted forwardly (the engine being at the rear of the tractor) which rocks the shaft 76 on its axis and through arm 77, bar 80 and shipper 67 slides gear 66 into mesh with gear 65. The main clutch is then released and the tractor starts forwardly at first on low speed. The lever is then shifted to the rear, disengaging gears 66 and 65 and engaging gears 66 and 61 to drive the tractor at high speed. Similarly, to drive the tractor in the reverse direction, the lever 75 is first moved laterally to the right, or away from the operator, to engage gears 73 and 70, after which the lever 75 is shifted in the same manner as before to secure low and high speeds. It will thus be seen that we are enabled to control an equal number of speeds of the tractor both forward and reverse by a single operating element.

The pinion 73 meshes with the bull gear 86 which is secured to the differential cage 87 carrying differential pinions meshing with the differential gears 89, 90 mounted on the inner ends of shafts 53, 54 respectively. The shafts 53, 54 carry the driving sprockets 52 as previously described and at their outer ends adjacent the sprockets are provided with brake drums 92 which form part of a steering means to be described later.

The implement driving shaft 46 is provided for power drive of an implement propelled by the tractor, which implement will as a rule be supported on a supplemental frame (not shown) pivotally connected at its rear end to brackets secured to the sides of the main frame. This supplemental frame has been omitted to avoid needless complication of the drawings and since it per se forms no part of the present invention. The shaft 46 is supported on bearings in a supplemental casing 96 bolted or otherwise secured on the under side of casing 30 and has a gear 97 splined thereon. The gear 97 is adapted to be shifted into and out of mesh with a gear 98 rotatably mounted on a fixed shaft in the supplemental casing and meshing with the transmission gear 65. The gear 97 is engaged by a shipper 99 fixed to the shaft 100. One end of the shaft 100 extends beyond the casing and carries an actuating lever 101 by means of which the shaft is oscillated to slide the gear 97 into and out of mesh with gear 98 for controlling operation of the implement driving shaft 46. Secured to the casing 96 adjacent the lower end of lever 101 is a segment having two notches 102, 103 adapted to be engaged by a yieldable detent 104 carried by the lever. (See Figs. 4 and 5.) When the detent engages in the notch 102, the lever 101 will be in its forward position and gears 97 and 98 in mesh. Correspondingly, when the lever is moved rearwardly, the detent will engage in notch 103 with the gears out of mesh and the shaft 46 inoperative.

As previously stated, the differential shafts 53, 54, are provided with brake drums 92 on their outer ends. These drums cooperate with brake bands which are controlled by braking mechanism in such a way that either of the differential shafts may be retarded to effect a quick turning movement of the tractor. The main clutch 57, previously referred to, is controlled by a clutch lever 150 (Fig. 3) mounted on one side of the casing 30. The lever 150 is a bell crank, the other arm of which is connected to a link the other end of which is attached in the usual manner to operate the clutch.

In addition to the brake drums 92 used to assist in steering, there is a drum 72 (Fig. 3) for stopping the tractor when desired. The drum 72 is engaged by a band 152 connected to an arm 153 depending from a brake lever 154 mounted on the cover 40 of the casing 30, as shown in Figs. 1 and 3.

It will thus be apparent that we have invented mechanism of the kind described that is compact and easy to operate, and while we have shown but one specific embodiment of our invention, it is to be understood that modifications and equivalents thereof are possible within the scope of the following claims.

What we claim is:

1. In a reversible tractor, the combination of a differential, a multi-speed transmission, a reversing mechanism connecting the transmission to the differential, and a single means for shifting the transmission and reversing mechanism, comprising two axially movable shafts arranged at right angles one of said shafts being rotatable, a connection between said shafts permitting independent axial movement thereof and through which rotation of one shaft causes axial movement of the other, connections between said shafts and the transmission and reversing mechanism respectively, and means for rotating and for axially moving the one shaft.

2. In a reversible tractor, the combination of a driving shaft, a driven shaft, transmission gearing for driving the driven shaft at different speeds from the driving shaft, a bevel gear on the driven shaft, a counter-shaft at right angles to the driven shaft, a pair of bevel gears journaled thereon and meshing with the first mentioned bevel gear, a clutch adapted to connect either bevel gear to the counter-shaft, and a single means for controlling the clutch and transmission gearing, comprising two axially movable shafts extending parallel to said driven shaft and counter-shaft respectively, one of said movable shafts being rotatable, a connection between said movable shafts permitting independent axial movement thereof and through which rotation of one shaft causes axial movement of the other, a connection between the clutch and the movable shaft parallel to the counter-shaft, a connection between the other movable shaft and one of the transmission gears, and a lever connected to the one movable shaft for both rotating it and moving it axially.

3. In a reversible tractor, the combination of a driving shaft, a driven shaft coaxial therewith, transmission gearing for driving the driven shaft at two speeds from the driving shaft, a bevel gear on the driven shaft, a counter-shaft, a pair of bevel gears having clutch elements journaled on the counter-shaft and meshing with the first mentioned bevel gear, a pinion splined to the counter-shaft between the bevel gears and having clutch elements adapted to engage the clutch elements on the bevel gears, and a single means for controlling both the clutch and transmission gearing, comprising two axially movable shafts extending parallel to said driven shaft and counter-shaft respectively, one of said movable shafts being rotatable, an arm fixed on one of said movable shafts and having a transversely slidable pivotal connection with the other movable shaft, a connection between the splined pinion on the counter-shaft and the movable shaft parallel to the counter-shaft, a connection between the other movable shaft and one of the transmission gears, and a lever connected to the one movable shaft for both rotating it and moving it axially.

In testimony whereof we affix our signatures.

EDWARD A. JOHNSTON.
PHILO H. DANLY.